United States Patent [19]

Lefevre et al.

[11] Patent Number: 5,886,785
[45] Date of Patent: Mar. 23, 1999

[54] OPTICAL SPECTRUM ANALYZER AND PROCESS FOR ANALYZING THE CORRESPONDING SPECTRUM

[75] Inventors: Hervé Lefevre, Paris; Philippe Martin, Pontchartrain; Bertrand Merigot, Paris; Bernard Laloux, Villepreux; Denis Mangeot, Aulnay-sur-Mauldre, all of France

[73] Assignee: Photonetics, Marly le Roi, France

[21] Appl. No.: 942,612

[22] Filed: Oct. 2, 1997

[30] Foreign Application Priority Data

Oct. 2, 1996 [FR] France ................................ 96 12021

[51] Int. Cl.⁶ .......................................... G01J 3/18
[52] U.S. Cl. ............................. 356/328; 356/334
[58] Field of Search .................... 356/305, 326, 356/328, 333, 334

[56] References Cited

FOREIGN PATENT DOCUMENTS

| 0 671 615 | 9/1995 | European Pat. Off. . |
| 0 702 438 | 3/1996 | European Pat. Off. . |
| 195 32 611 | 7/1996 | Germany . |

OTHER PUBLICATIONS

J.P. Sage et al., "High Power Funable Dual Frequency Laser System", *Optics Communications*, vol. 42, No. 6, 1982, Amsterdam, Netherlands, pp. 428–430.

*Primary Examiner*—F. L. Evans
*Attorney, Agent, or Firm*—Young & Thompson

[57] ABSTRACT

The invention relates to an optical spectrum analyzer of an incident light beam (101) and a process for analyzing the corresponding spectrum. The spectrum analyzer comprises addressing means (1), a diffraction grating (2), a reflecting dihedron (3), a device (4) for adjusting the rotation of the reflecting dihedron and reception means (5). A polarization separator (11) divides the incident beam (101) into a first and second parallel secondary beam (102, 104), of linearly polarized light along the directions parallel to and perpendicular to the grooves in the grating respectively, and a λ/2 plate (12) placed on the path of the first secondary beam (102) applies a perpendicular polarization direction to this beam. The grating diffracts the secondary beams (103, 104) a first time, the reflecting dihedron exchanges their directions, the grating diffracts them a second time, the λ/2 plate applies a 90° rotation to the polarization state of the second secondary beam (110) and the separator recombines the secondary beams (109, 111) into a single main beam (112) returned to reception means.

12 Claims, 6 Drawing Sheets

OPTICAL SPECTRUM ANALYZER AND PROCESS FOR ANALYZING THE CORRESPONDING SPECTRUM

This invention relates to a high precision optical spectrum analyzer and a process for analyzing the corresponding spectrum.

High precision spectroscopic analyses are necessary in many applications, particularly for the design of optical fiber gratings with dense wavelengths domain multiplexing. Conventional analyzers do not have a sufficient resolution power and precision to give satisfactory results. The resolution of an analyzer is defined as the full width at mid-height of the response of a single frequency laser, the resolution is about 0.1 nm for conventional analyzers, although it should be five to ten times less to satisfy analysis needs.

The diffraction grating is one spectral analysis system that can give a good optical resolution. A grating assembly using a Littmann-Metcalf configuration includes a reflector that forces a double pass on the grating. This assembly gives good optical stability by self-alignment when the reflector is a dihedron and gives a very good angular dispersion, which improves the optical resolution.

In the Littmann-Metcalf configuration, several parameters may be used to improve the resolution, but each of them causes specific problems. Thus, the improvement obtained by adopting a low grating pitch or groove spacing p causes a problem in the size of the system. Furthermore, since the analyzer includes a focal length f collimation lens, increasing the focal length f increases the dispersion in the focal plane which improves the resolution. However, the dependence on chromatism is then increased, which causes difficulty in collimation and refocusing for some wavelengths. The resolution can also be improved by adopting a grazing incidence on the grating. But this causes efficiency losses due to losses in the cavity.

Furthermore, the analyzer in the Littmann-Metcalf configuration is sensitive to polarization of the incident wave, since the grating efficiency is very dependent on polarization for low angles of incidence on the grating. This causes a significant variation in the signal level with polarization.

To overcome this disadvantage, an analyzer was proposed with a diffraction grating in the Littmann-Metcalf configuration, in which a $\lambda/4$ plate is placed between the grating and the reflector. Although this system is theoretically insensitive to polarization, it does lead to important losses if incidence is low. Therefore, it is not satisfactory for grazing incidence if good resolution is required.

The purpose of the invention is a spectrum analyzer that can give a good resolution, is not very dependent on chromatism and polarization, and produces minimum losses.

The invention also relates to this type of analyzer making a resolution of less than 20 pm possible.

Another objective of the invention is a high precision spectrum analysis process, which is only slightly sensitive to chromatism and polarization and in which cavity losses are low.

Consequently, the purpose of the invention is an optical spectrum analyzer with an incident light beam comprising:
  means of addressing the incident light beam,
  a diffraction grating equipped with parallel grooves, receiving and diffracting the beam a first time,
  a reflecting right-angled dihedron into which the beam is input after being diffracted once, reflecting the beam to the grating, this grating diffracting the beam a second time,
  a device for adjusting the rotation of the reflecting dihedron, to be able to select measurement wavelengths,
  means of reception of the selected beam,
  at least one photodetector connected to the reception means detecting the received beam, and
  a processing unit connected to the photodetectors and to the adjustment device producing a spectrum of the beam.

These analyzer means define a spectral analysis system with a diffraction grating in a Littmann-Metcalf configuration.

The spectrum analyzer according to the invention comprises:
  a polarization separator inserted between firstly the addressing and reception means, and secondly the diffraction grating, dividing the incident beam into first and second parallel secondary beams of linearly polarized light along the directions parallel and perpendicular to the grooves in the grating, and
  $\lambda/2$ plate placed on the path of the first secondary beam to apply to it a polarization direction perpendicular to the grooves in the grating.

The grating, the reflecting dihedron and the separator are positioned such that the grating diffracts the secondary beams a first time, the reflecting dihedron exchanges their directions, the grating diffracts them a second time and the separator recombines them into the same main beam returned to the reception means.

With this device, two beams polarized perpendicular to the grooves in the grating, can be input into the grating. This saves a great deal of energy, since it minimizes the losses generated by diffraction on the grating. Furthermore, since a dihedron is used, the two secondary beams are exchanged inside the dihedron before passing on the grating again. In return, the two secondary beams combine in the polarization separator after having passed along exactly the same optical path in the reverse direction. Therefore the system is intrinsically insensitive to polarization.

Preferably, the spectrum analyzer comprises an auxiliary reflector reflecting the secondary beams after being diffracted twice and returning them to the grating. The grating diffracts them a third time, the reflecting dihedron reflects them a second time, the grating diffracts them a fourth time and the separator recombines the secondary beams diffracted four times into the same main beam.

This assembly enables the light to be diffracted four times, the resolution being improved each time it passes on the grating.

In the first preferred embodiment of the polarization separator, the polarization separator is periscopic.

The polarization separator thus comprises a prism with the shape of a right angled triangle comprising a hypotenuse, and an splitter with parallel sides adapted on the hypotenuse of the prism. The incident beam is input on the hypotenuse and is broken down into first and second secondary beams directed into the prism and into the parallel sided splitter respectively, along perpendicular directions. The parallel sided splitter redirects the second secondary beam parallel to the first secondary beam.

The periscopic separator is suitable for a fairly large beam diameter, for example of about 10 mm.

In a second preferred embodiment of the polarization separator, the polarization separator is a birefringent crystal.

This type of separator is suitable for small beams, for example with a diameter of about 3 mm.

In a first beneficial embodiment of addressing and reception means, these means use the same optical fiber and a collimator, and the spectrum analyzer comprises a coupler separating the emitted beam and the received beam.

In a second beneficial embodiment of the addressing and reception means, they include the same optical fiber and a collimator, and the spectrum analyzer comprises a circulator with at least three successive branches in the direction of circulation of the circulator, connected to a light source, the optical fiber and photodetectors respectively.

The circulator eliminates the effects on the analyzer of energy losses produced in the coupler.

In a third beneficial embodiment of the addressing and reception means, the addressing means comprise an optical fiber and an input collimator and reception means comprise an optical fiber and an outlet collimator, these fibers being placed side by side.

This also eliminates the effects of energy losses in the coupler.

In this third embodiment of the addressing and reception means, it is interesting that the entry and exit fibers are combined to form a coupler separated into two.

Advantageously, the spectrum analyzer comprises an electric switch connected to the reflecting dihedron rotation adjustment device, this switch producing a calibration reference each time the spectrum analyzer is switched on.

Preferably, the spectrum analyzer comprises a reference addressing system connected to addressing means, emitting a calibration beam at at least one reference wavelength in the analyzer.

This thus makes an in situ calibration due to the fact that the reference addressing system forms part of the analyzer ; this system can give a very good absolute precision for calibration during each startup.

The invention also relates to a spectrum analysis process in which:

an incident light beam is addressed, the beam is diffracted a first time by means of a diffraction grating equipped with parallel grooves, the diffracted beam is reflected once to the grating at a variable reflection angle capable of selecting a measurement wavelength, the beam is diffracted a second time, the selected beam is received and detected, and a beam spectrum is produced starting from this detection, by variation of the angle of reflection.

According to the invention:

after emitting the incident beam, it is divided into first and second secondary parallel beams of linearly polarized light along directions parallel and perpendicular to the lines or grooves in the grating, by means of a polarization separator, the polarization direction of the first secondary beam is made perpendicular to the grooves in the grating, the secondary beams are diffracted a first time by means of the grating, they are reflected towards the grating, they are diffracted a second time, the second secondary beam has a polarization state, this state is rotated by 90°, and the secondary beams are recombined into a single main beam using the separator.

Preferably, after diffracting the secondary beams twice:

they are reflected to the grating, they are diffracted a third time, they are reflected a second time as a function of the variable reflection angle towards the grating, they are diffracted a fourth time, and they are recombined into the same main beam.

The invention will be better understood by means of the following description of example embodiments and construction, with reference to the attached drawings in which.

In the figures, the beams are represented by their central radii.

Figure 1:
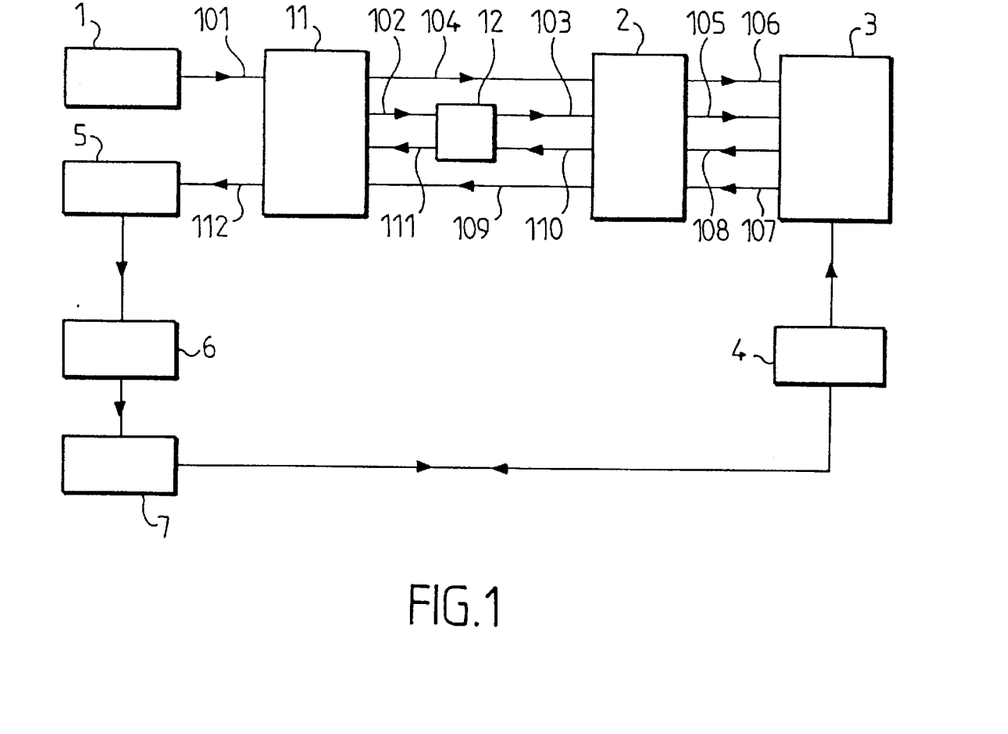
FIG. 1 is a block diagram showing an embodiment of the spectrum analyzer according to the invention.

A spectrum analyzer with a diffraction grating in the Littmann-Metcalf configuration, like that shown diagrammatically in FIG. 1, comprises addressing means 1, a diffraction grating 2, a right angled reflecting dihedron 3 and reception means 5. The reflecting dihedron 3 is placed in the spectrum analyzer so as to return a light beam emitted by addressing means 1 and diffracted a first time towards grating 2 then reception means 5, so that the beam passes twice on grating 2. The reception means 5 are connected to one or several photodetectors 6 detecting the received beam and transmitting signals produced by detection to a processing unit 7. Conventionally in a Littmann-Metcalf configuration, the reflecting dihedron 3 is free to rotate, each angle of reflection selecting a measurement wavelength.

The spectrum analyzer comprises a device 4 for adjusting the rotation of the reflecting dihedron 3 connected to the processing unit 7 that varies the reflection angle of the dihedron 3. The processing unit 7 produces a spectrum of the beam starting from the received signals originating from the photodetector 6 and the adjustment device 4.

According to the invention, the spectrum analyzer also includes a polarization separator 11 inserted between firstly the addressing means 1 and reception means 5, and secondly the grating 2. The polarization separator 11 divides an incident beam 101 emitted by addressing means 1 into first and second parallel secondary beams 102 and 104, of linearly polarized light along orthogonal directions. The spectrum analyzer also comprises a λ/2 plate reference 12 placed on the path of the first secondary beam 102.

Grating 2 being equipped with parallel grooves 40 (FIG. 2), the polarization direction of the first secondary beam 102 is parallel to grooves 40, whereas the polarization direction of the second secondary beam 104 is perpendicular to grooves 40. λ/2 plate 12 rotates the parallel polarization of the first secondary beam 102 to put it in orthogonal polarization. The first secondary beam 103 thus obtained, and the second secondary beam 104 are thus both input into grating 2 with a linear polarization perpendicular to grooves 40. This thus saves a great deal of energy, since losses generated by diffraction on grating 2 are minimized.

Figure 2:
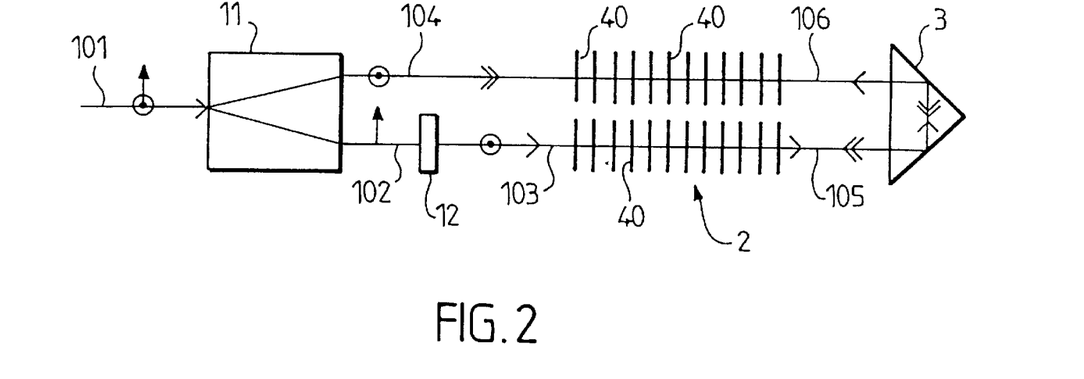
FIG. 2 is a principle diagram illustrating operation of the spectrum analyzer in FIG. 1.

In operation, the incident beam 101 is emitted with addressing means 1, it is divided into two secondary beams 103 and 104 of linearly polarized light along a direction perpendicular to grooves 40 in grating 2, and the secondary beams 103 and 104 are diffracted a first time by means of grating 2. The secondary beams 105 and 106 originating from the secondary beams 103 and 104 are thus reflected using dihedron 3 into reflected secondary beams 107 and 108, by exchanging the directions of the secondary beams 105 and 106. The secondary beams are diffracted again in grating 2, so as to produce the first and second secondary beams 109 and 110 diffracted twice. The second secondary beam 110 has a polarization state, and this state is rotated by 90° using plate 12, and the first secondary beam 109 and the second secondary beam 111 thus obtained are then recombined into a single main beam 112 using the separator 11. The main beam 112 is received and then detected using reception means 5 and photodetectors 6, and a spectrum of the beam is produced using processing unit 7.

Figure 3:
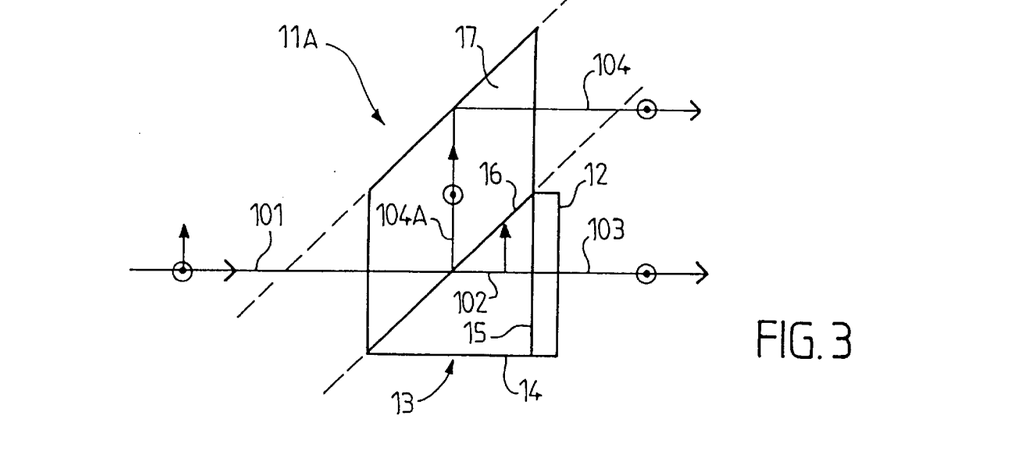
FIG. 3 shows a first embodiment of the spectrum analyzer polarization separator in FIGS. 1 and 2.

According to a first embodiment of the polarization separator 11, it is in the form of a periscopic separator 11A shown in FIG. 3. This separator 11A comprises a prism 13 in the shape of a right angled triangle with a hypotenuse 16 and two perpendicular sides 14 and 15. The separator 11A also comprises a splitter 17 with parallel sides adapted on hypotenuse 16 of prism 13. The hypotenuse 16 is treated to separate polarizations of the incident beam 101. The incident beam 101 is input into it, and it divides this beam into the first and second secondary beams 102 and 104A. The first secondary beam 102 continues along the same direction as the incident beam 101, in prism 13, whereas the second secondary beam 104A is directed perpendicular to the incident beam 101 in splitter 17. Splitter 17 straightens the second secondary beam 104A parallel to the first secondary beam 102, beam 104A becoming beam 104. The output side of the periscope is polished again, ensuring that the splitter 17 and prism 13 are coplanar and giving good parallelism between the two secondary beams 102 and 104.

The λ/2 plate reference 12 is placed in contact with side 15 of prism 13, so that the polarization of beam 102 is made perpendicular.

Other prism and plate assemblies may be used, provided that they divide the incident beam 101 into two parallel secondary beams 103 and 104 with linear polarizations parallel and perpendicular to the grooves 40 in grating 2.

The periscopic separator is adapted to a beam with a fairly large diameter requiring a system with fairly large openings.

Figure 4A:
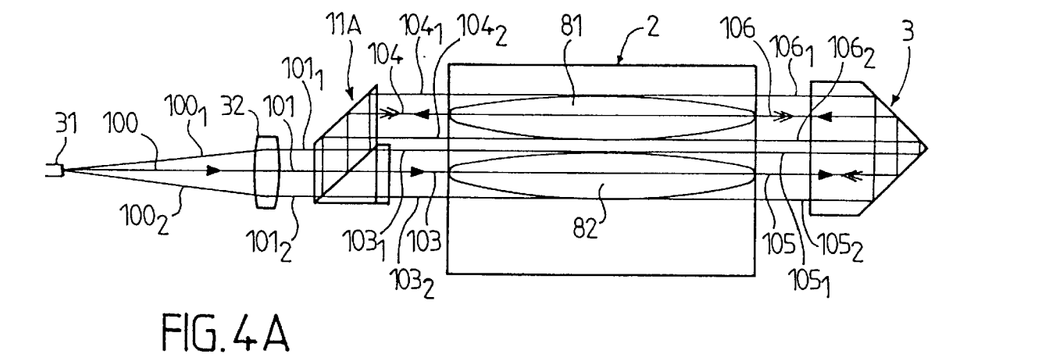
FIG. 4A is a side view of the spectrum analyzer in FIGS. 1 and 2 equipped with the polarization separator in FIG. 3.
Figure 4B:
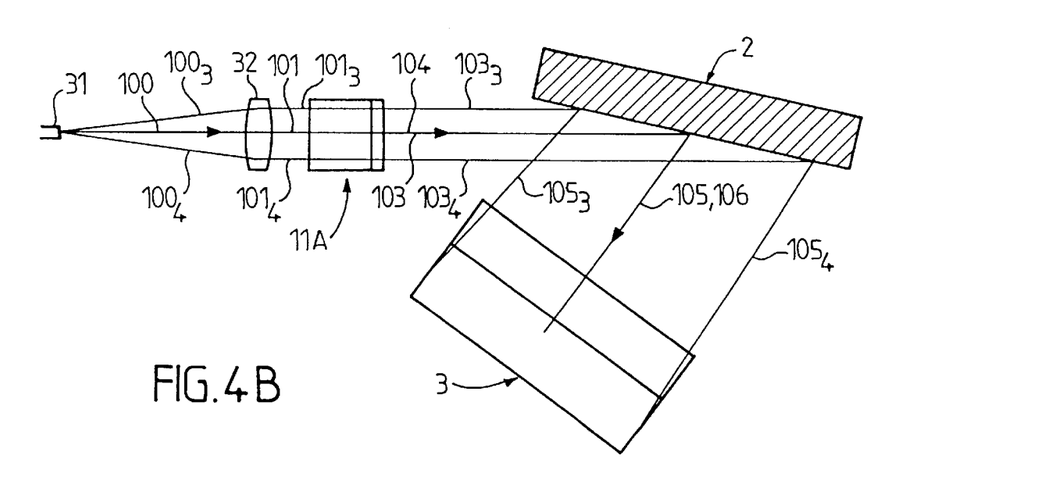
FIG. 4B is a top view of the spectrum analyzer represented in FIG. 4A.

Addressing means 1 and reception means 5 associated with the periscopic separator 11A may comprise an optical fiber 31 and a collimator 32 as shown in FIGS. 4A and 4B.

Fiber 31 is preferably a single mode fiber and collimator 32 is preferably a laser diode doublet inserted between fiber 31 and separator 11A. Collimator 32 may also be an aspherical lens.

During operation, divergent light beam 100 is emitted with marginal rays $100_1$–$100_4$ using fiber 31. This beam 100 is transformed by collimator 32 into a parallel beam, which is the incident beam 101, with marginal rays $100_1$–$100_4$. The secondary beams 103 and 104, with marginal rays $103_1$–$103_4$ and $104_1$–$104_2$ respectively, form ellipses 81 and 82 on grating 2 at the intersection of beams 103, 104 and grating 2. They then become beams 105 and 106, with marginal rays $105_1$–$105_4$ and $106_1$–$106_2$ respectively. On return, the main beam 112, which is a parallel beam, is made to converge to fiber 31 using collimator 32.

Figure 5A:
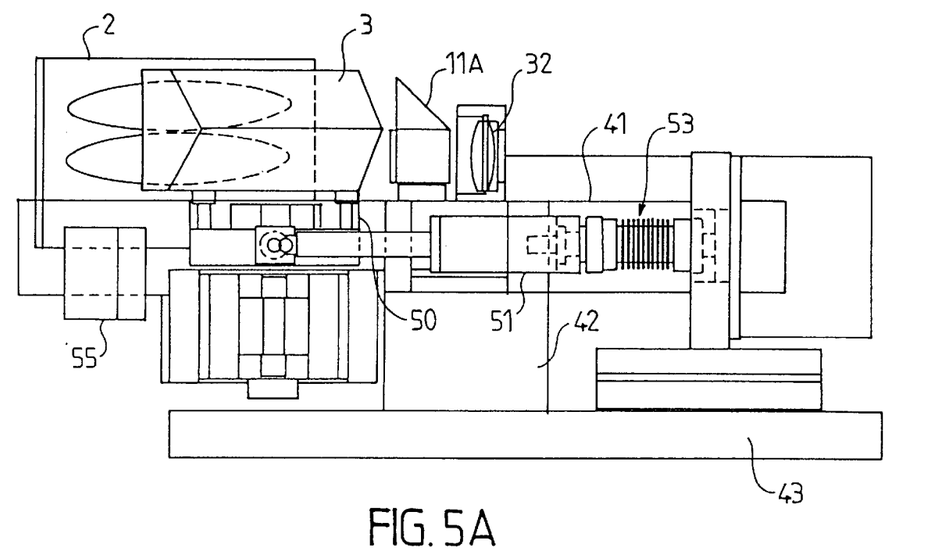
FIG. 5A is side view of a first embodiment of the spectrum analyzer according to the invention, incorporating the polarization separator in FIG. 3.
Figure 5B:
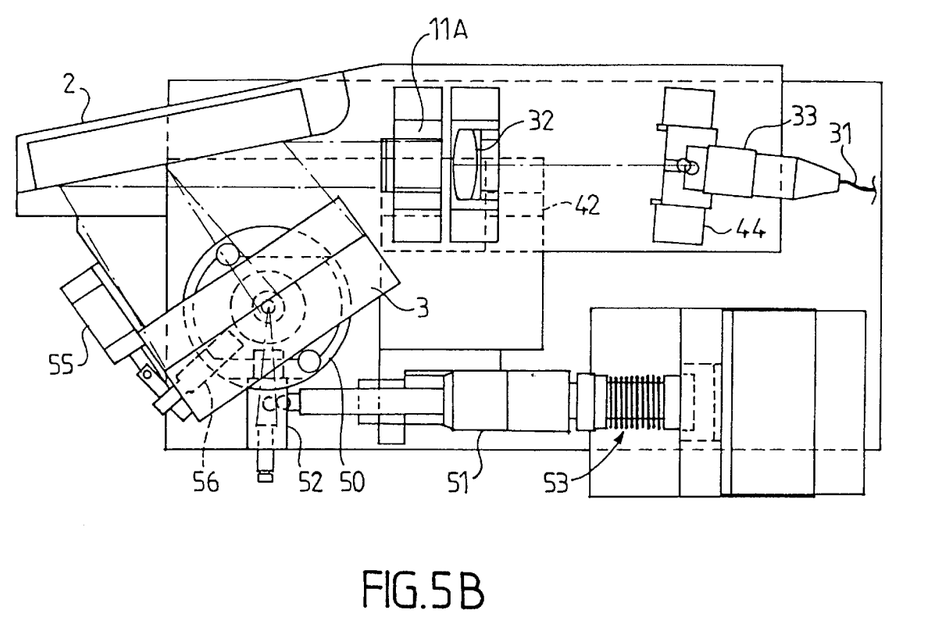
FIG. 5B is a top view of the spectrum analyzer in FIG. 5A.

A particular assembly represented in detail in FIGS. 5A and 5B provides a specific example of a spectrum analyzer according to the invention equipped with a periscopic separator 11A, an optical fiber 31 and a collimator 32 in the form of a laser diode doublet. For the opto-mechanical part, the assembly of parts is placed on a beam 41 which is fairly thick to ensure that it is very rigid and to keep them coplanar. This beam 41 is supported on a base plate 43 by a stand 42.

The periscopic separator 11A and the collimator 32 are bonded on adapted supports and are then screwed on a platform composed of the upper part of beam 41. On the other hand, grating 2 is bonded directly using UV glue. Fiber 31, equipped with an optical head 33, is supported on a support 44 held in place with an XYZ positioner in order to make a fine adjustment. The support 44 is fixed with silica shims held in place by a glue that is insulated with UV.

The spectrum analyzer comprises a rotation plate 50 supporting the dihedron 3. The rotation precision is controlled by precision ball bearings and the plate 50 displaces using a stepping motor 53 by means of a precision micrometer screw 51. The plate 50 is rigidly attached to a pin 52 activated by the micrometer screw 51; motor 53 drives screw 51, which pushes the plate 50 pin 52. The return movement is made under the control of a tensioned spring between pin 52 and the screw 51 support.

The spectrum analyzer also comprises an electrical switch 55 acting on a pin 56 rigidly attached to plate 50. This switch 55 gives the zero each time that the analyzer is switched on.

The actions of motor 53 and switch 55 are beneficially controlled by electronic cards.

In a specific example of an embodiment, the grating 2 comprises 900 grooves/mm, the angle of incidence on grating 2 is equal to 12°, and the collimator has a focal distance f=40 mm. This high focal length which gives a beam diameter exceeding 10 mm, is possible due to the periscopic separator 11A. The theoretical resolution of this system is equal to 26 pm, and in practice 30 to 35 pm is achieved.

Figure 6:
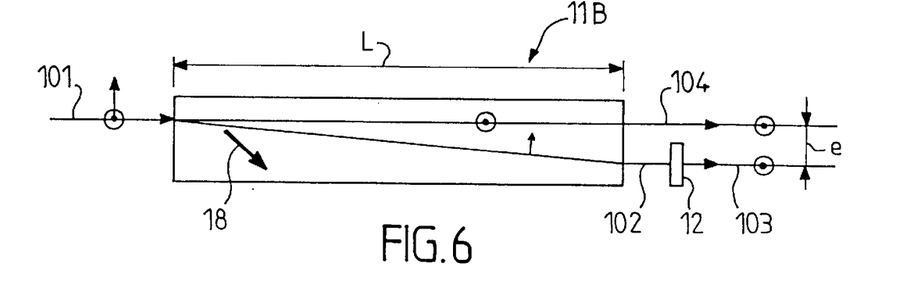
FIG. 6 shows a second embodiment of the spectrum analyzer polarization separator according to the invention.

In a second embodiment of the polarization separator 11, the separator is a double refraction crystal 11B. In an example shown in FIG. 6, a calcite crystal is used with an optical axis 18 at an angle of 45° from the entry face and a length L. The crystal 11B divides the incident beam 101 into two secondary beams 102 and 104 separated by distance e equal to 10% of the length L. Preferably, crystal entry and exit faces are well polished parallel to each other, in which case the parallelism of the output beams is very good. The double refraction crystals 11B are suitable for small beams.

Figure 7A:
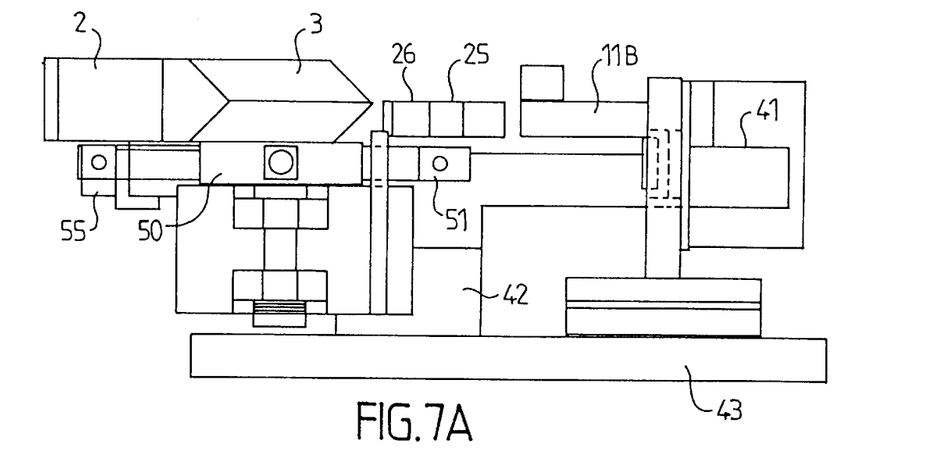
FIG. 7A is a side view of a second embodiment of the spectrum analyzer, incorporating the polarization separator in FIG. 6.
Figure 7B:
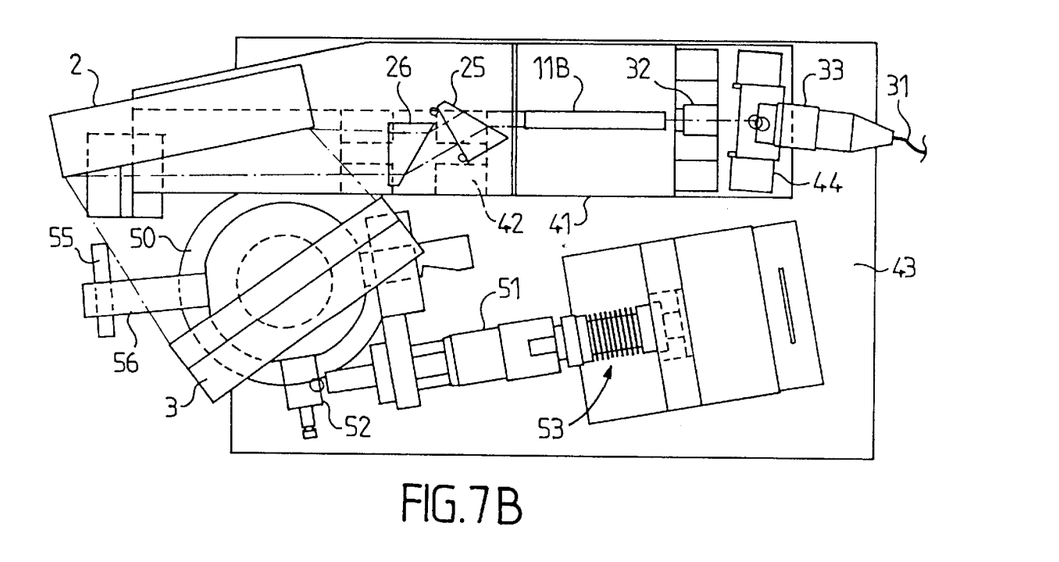
FIG. 7B is a top view of the spectrum analyzer in FIG. 7A.

In a second embodiment of an analyzer according to the invention shown in FIGS. 7A and 7B, the analyzer incorporates the polarization separator in the form of a double refraction crystal 11B. Elements in these figures that are the same as elements in FIGS. 5A and 5B are denoted by the same references.

The collimator 32 has a short focal length f, such that the incident beam 101 is sufficiently small to be adapted to the double refraction crystal 11B. This spectrum analyzer comprises a pair of anamorphosing prisms 25 and 26, placed between the double refraction crystal 11B and the grating 2, which compensates for the reduction in the focal length f. This maintains a good resolution.

For example, the focal length f of the collimator 32 is 10 mm, the output beam having a diameter of 3 mm and the anamosphosing prisms 25, 26, producing an incident beam 101 about 10 mm wide.

Figure 8:
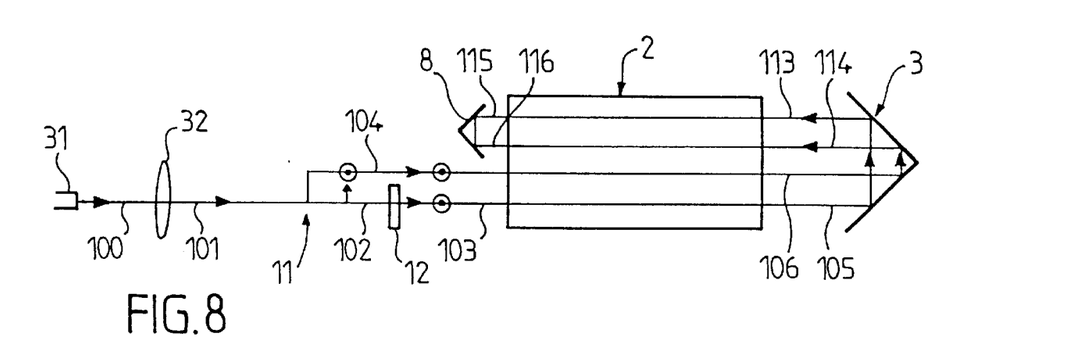
FIG. 8 diagrammatically shows a third embodiment of the spectrum analyzer according to the invention, with four passes on the grating.

In a third embodiment of the spectrum analyzer shown in FIG. 8, there is an auxiliary reflector 8 on the return path of the secondary beams 115, 116, diffracted twice. For example, this auxiliary reflector 8 may be a small dihedron. During operation, secondary beams are reflected by the auxiliary reflector 8 to grating 2 and then to the reflecting dihedron 3, so that they pass four times on grating 2 before being combined into the main beam.

This configuration with four passes consists preferably of a double stage assembly. When the polarization separator is a double refraction crystal 11B, this assembly does not need a very tall grating 2 due to the small size of the beams in the vertical dimension (perpendicular to the direction of propagation and in the plane in FIG. 8), anamorphosis only taking place in the horizontal dimension.

The configuration with four passes can also be obtained by an assembly with two symmetrical gratings.

Figure 9:
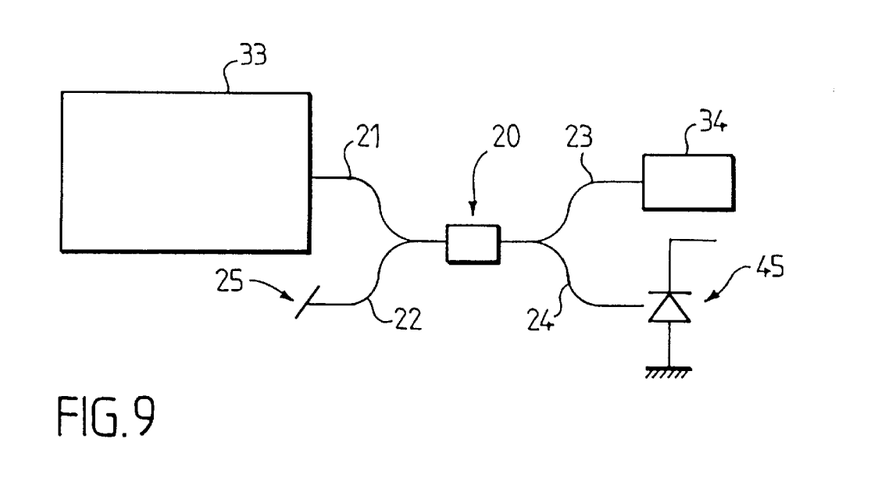
FIG. 9 shows a first embodiment of addressing and reception means for a spectrum analyzer according to the invention.

In a first embodiment of addressing means 1 and reception means 5 shown in FIG. 9, the analyzer comprises a 3 dB coupler reference 20 comprising two input branches 21, 22 and two output branches 23, 24. The first input branch 21 is connected to the optical head 33 of the optical fiber 31, and end 25 of the second input branch 22 is polished skew. The first output branch 23 is connected to an input 34 of the analyzer through which a light signal is input and the second output branch 24 is connected to an electronic power measurement card 45. During operation, the light is thus transmitted from the input 34 to the optical head 33, and then on return is directed from the optical head 33 to card 45 for measurements.

Figure 10:
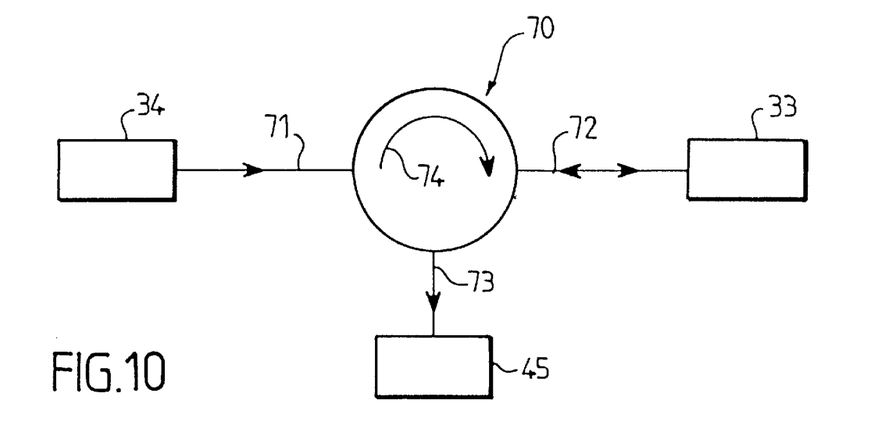
FIG. 10 shows a second embodiment of addressing and reception means according to the invention.

In a second embodiment of the addressing and reception means shown in FIG. 10, the analyzer comprises an optical circulator 70 with three successive branches 71–73 in a circulation direction 74. These three branches 71–73 are connected to the analyzer input 34, the optical head 33, and the electronic card 45 respectively. This embodiment has the advantage of generating very low energy losses.

Figure 11:
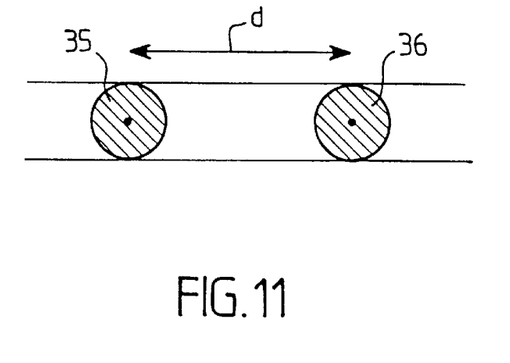
FIG. 11 shows a third embodiment of addressing and reception means according to the invention.

In a third embodiment of the addressing and reception means shown in FIG. 11, the optical fiber 31 is replaced by two single mode optical fibers, namely the input fiber 35 and the output fiber 36. The two fibers 35 and 36 are placed horizontally at a distance d from each other, with their faces being in the same vertical plane. For example, the distance d may be equal to 125 μm.

This results in very low energy losses and independence in polarization for emission and for reception.

Figure 12:
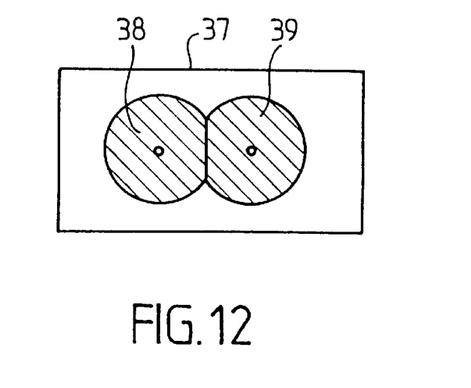
FIG. 12 shows a fourth embodiment of addressing and reception means according to the invention.

In a variant of this third embodiment shown in FIG. 12, the analyzer comprises a coupler 37 separated into two, so as to define two fibers 38 and 39 adjacent to the input and output respectively.

Advantageously, a gold reflection treatment is applied to grating 2. This treatment gives good efficiency of grating 2 for low angles of incidence.

A preferred embodiment of the spectrum analyzer includes a reference addressing system that may be used with a switch 55. This reference addressing system forms an integral part of the analyzer and thus enables in situ calibration.

Figure 13:
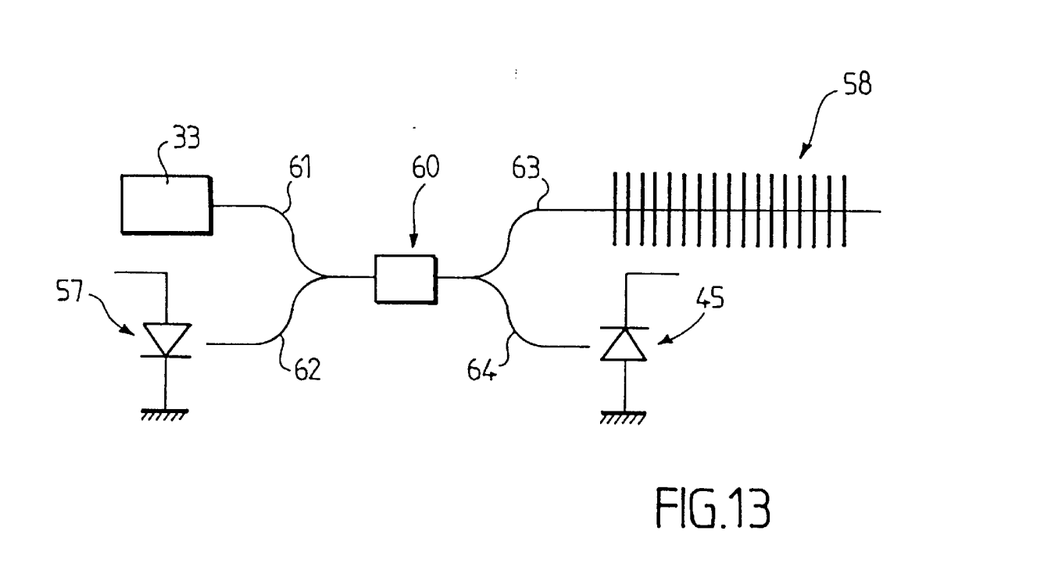
FIG. 13 diagrammatically shows an in situ calibration system built into the spectrum analyzer according to the invention.

In a specific example of this type of system shown in FIG. 13, the system comprises a 3 dB coupler reference 60 with two input branches 61, 62, and two output branches 63, 64. The two input branches 61 and 62 are connected respectively to the optical head 33 of the optical fiber 31 and to a light emitting diode (LED) 57, whereas the two output branches 63 and 64 are connected respectively to a Bragg reflector 58 and the electronic card 45. Preferably, the Bragg reflector 58 is preferably narrow, for example 100 pm and the band width of the diode 57 is sufficient to be within the reflection wavelength of reflector 58. During operation, the Bragg reflector 58 is illuminated with diode 57, light reflected by reflector 58 is returned into the optical head 33, in addressing, and then it is recovered in this optical head 33 in reception to be sent to electronic card 45. The measured light gives an absolute reference to the optical system, which is precise and has good repeatability in time.

For example, if the width of the Bragg reflector 58 is 100 pm, it is possible to repeatably provide a wavelength reference to within 10 pm.

The dependence of reflector 58 on temperature may be solved by a temperature servocontrol or a temperature measurement at the time of calibration thus giving a precise addressing wavelength.

Figure 14:
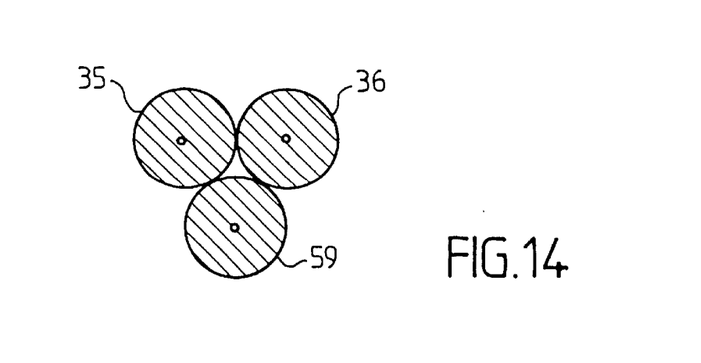
FIG. 14 shows addressing and reception means adapted to the calibration system in FIG. 13.

The reference addressing system advantageously comprises an additional addressing optical fiber 59 connected to optical head 33. This may be additional to one of the previously described embodiments of the addressing and reception means, such as the third embodiment with two optical fibers 35 and 36. In this case, fibers 35, 36 and 59 are fixed together preferably as shown in FIG. 14 to prevent from working too much within the field of the lens.

It is also possible to use a spectral lamp instead of the previous assembly, which has a known wavelength and which is repeatable in time. However the reference addressing system with the Bragg reflector is particularly advantageous since it enables a narrow spectral width.

The calibration is done for one or several wavelengths within the usage range of the apparatus, in other words for example between 1450 and 1550 nm for a fiber doped with erbium. It may be useful, although it is not necessary, to choose two calibration wavelengths in order to give an offset value and a scale factor. A single beam is usually sufficient to provide the spectrum analyzer with an absolute reference.

We claim:

1. Optical spectrum analyzer of an incident light beam (101) comprising:

means of addressing (1, 31–35, 38) the incident light beam (101), a diffraction grating (2) equipped with parallel grooves (40), to which the said beam (103, 104) is input and diffracted a first time, a right angled reflecting dihedron (3) into which the beam (105, 106) is input after being diffracted once and which reflects it to the grating (2), the said grating (2) diffracting the said beam (107, 108) a second time, a device (4, 50–53) for adjusting rotation of the reflecting dihedron (3), in order to select measurement wavelengths, means of reception (5, 31–33, 36, 39) of the selected beam (112), at least one photodetector (6) connected to the reception means (5, 31–33, 36, 39), detecting the received beam (112) and, a processing unit (7) connected to the photodetectors (6) and the adjustment device (4, 50–53) producing a spectrum of the beam, characterized in that it comprises:

a polarization separator (11) inserted between firstly the addressing and reception means (1, 5, 31–39), and secondly the diffraction grating (2), dividing the incident beam (101) into a first and second parallel beam (102, 104) with light polarized linearly along two directions parallel and perpendicular to the grooves (40) in the grating (2), and a λ/2 plate (12) placed on the path of the first secondary beam (102), to give it a polarization direction perpendicular to the grooves (40) in the grating (2), and in which the grating (2), the reflecting dihedron (3) and separator (11) are positioned such that the grating (2) diffracts the secondary beams (103, 104) a first time, the reflecting dihedron (3) exchanges their directions, the grating (2) diffracts them a second time and the separator (11) recombines them into the same main beam (112) returned through reception means (5, 31–33, 36, 39).

2. Spectrum analyzer according to claim 1, characterized in that it comprises an auxiliary reflector (8) reflecting the secondary beams (115, 116) diffracted twice, and returning them to the grating (2), the said grating (2) diffracting them a third time, the reflecting dihedron (3) reflecting them a second time, the grating (2) diffracting them a fourth time and the separator (11) recombining the secondary beams after being diffracted four times into a single main beam.

3. Spectrum analyzer according to claim 1, characterized in that the polarization separator (11A) is periscopic.

4. Spectrum analyzer according to claim 1, characterized in that the polarization separator (11B) is a double refraction crystal.

5. Spectrum analyzer according to claim 1, characterized in that the addressing means (1, 31, 34) and the reception means (5, 31–33) comprise the same optical fiber (31) and a collimator (32), and the spectrum analyzer comprises a coupler (20) separating the emitted beam (100) and the received beam (112).

6. Spectrum analyzer according claim 1, characterized in that the addressing means (1, 31–34) and reception means (5, 31–33) comprise the same optical fiber (31) and a collimator (32), and the spectrum analyzer comprises a circulator (70) with at least three successive branches (71–73) in a circulation direction (74) of the circulator (70), connected to a light source (34), the optical fiber (31) and photodetectors (6) respectively.

7. Spectrum analyzer according to claim 1, characterized in that the addressing means (1, 34, 35, 38) comprise an optical fiber (35, 38) and an input collimator and reception means (5, 36, 39), an optical fiber (36, 39) and an output collimator, the said fibers (35, 36, 38, 39) being placed side by side.

8. Spectrum analyzer according to claim 7, characterized in that the input fiber (38) and the output fiber (39) are fixed side by side to form a coupler (37) separated into two.

9. Spectrum analyzer according to claim 1, characterized in that it comprises an electrical switch (55) connected to the reflecting dihedron (3) rotation adjustment device (4, 50–53), the said switch (55) giving a calibration reference every time that the spectrum analyzer is switched on.

10. Spectrum analyzer according to claim 1, characterized in that it comprises a reference addressing system (57–64) connected to addressing means (1, 31–35, 38) emitting a calibration beam at, at least, one reference wavelength in the analyzer.

11. Spectrum analysis process in which:

an incident light beam (101) is addressed, the said beam (103, 104) is diffracted once using a diffraction grating (2) equipped with parallel grooves (40), the beam (105, 106) diffracted once, is reflected to the grating (2) at a variable angle of reflection such that a measurement wavelength can be selected, the said beam (107, 108) is diffracted a second time, the selected beam (112) is received and detected, and a spectrum of the beam is produced from the said detection by varying the angle of reflection, characterized in that:

after emitting the incident beam (101), it is divided into a first and second parallel secondary beam (102, 104) of light polarized linearly in the directions parallel to and perpendicular to the grooves (40) in grating (2) using a polarization separator (11), the direction of polarization of the first secondary beam (102) is made perpendicular to the grooves (40) in grating (2), the secondary beams (103, 104) are diffracted a first time using grating (2), they are reflected to the grating (2), they are diffracted a second time, the second secondary beam (110) has a polarization state, and the said state is rotated by 90°, and the secondary beams (109, 111) are recombined into a single main beam (112) using the separator (11).

12. Spectrum analysis process according to claim 11, characterized in that after diffracting the secondary beams (115, 116) twice:

they are reflected to the grating (2), they are diffracted a third time, they are reflected a second time at a variable angle of reflection to grating (2), they are diffracted a fourth time, and they are recombined into the same said main beam (112).

* * * * *